(12) United States Patent
Artner

(10) Patent No.: US 11,965,634 B2
(45) Date of Patent: Apr. 23, 2024

(54) ILLUMINATION DEVICE FOR A MOTOR VEHICLE HEADLIGHT

(71) Applicant: ZKW Group GmbH, Wieselburg (AT)

(72) Inventor: Martin Artner, Maria Taferl (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/027,719

(22) PCT Filed: Aug. 25, 2021

(86) PCT No.: PCT/EP2021/073517
§ 371 (c)(1),
(2) Date: Mar. 22, 2023

(87) PCT Pub. No.: WO2022/073683
PCT Pub. Date: Apr. 14, 2022

(65) Prior Publication Data
US 2023/0375150 A1    Nov. 23, 2023

(30) Foreign Application Priority Data

Oct. 6, 2020  (EP) .................................... 20200332

(51) Int. Cl.
*F21S 41/63* (2018.01)
*F21S 41/24* (2018.01)
(Continued)

(52) U.S. Cl.
CPC .............. *F21S 41/635* (2018.01); *F21S 41/24* (2018.01); *F21S 41/25* (2018.01); *F21S 41/295* (2018.01); *G02B 7/028* (2013.01)

(58) Field of Classification Search
CPC .......... F21S 41/24; F21S 41/25; F21S 41/635; G02B 7/028
See application file for complete search history.

(56) References Cited

U.S. PATENT DOCUMENTS 8,888,345 B2 * 11/2014 Tillmann ............... B60Q 1/076
362/547
2010/0259946 A1   10/2010 Seiger
(Continued)

FOREIGN PATENT DOCUMENTS

CZ          2013981 A3     2/2015
DE    102014000474 A1 * 10/2014 .......... F21S 48/1216
(Continued)

OTHER PUBLICATIONS

Bahnmueller et al., Lichtmodul für einen Kraftfahrzeugscheinwerfer und Scheinwerfer mit einem solchen Lichtmodul, 2018, DE102017106864A1, English Translation, https://worldwide.espacenet.com/patent/search/family/063525665/publication/DE102017106864A1?q=pn%3DDE102017106864A1 (Year: 2018).*
(Continued)

*Primary Examiner* — Tracie Y Green
*Assistant Examiner* — Michael Chiang
(74) *Attorney, Agent, or Firm* — Eversheds Sutherland (US) LLP

(57) ABSTRACT

Illumination device (1) for a motor vehicle headlight, comprising an illuminant, an optical element (2) for forming light distribution, wherein the optical element (2) has a focal point, a holding device (3), which holds the position of the optical element (2) in relation to the illuminant, wherein the holding device (3) has a compensating element (4), which connects the optical element (2) to the holding device (3), wherein the compensating element (4) has a first end section (4a) and a second end section (4b), wherein the first end section (4a) is connected to the optical element (2) and the second end section (4b) is connected to the holding device (3), wherein the compensating element (4) is designed in such a way that the compensating element (4) has a temperature-dependent longitudinal extension in one direction (Continued)

(X), wherein the compensating element (4) is connected to the optical element (2) in such a way as to pivot and/or move the optical element (2) as a function of a temperature relative to a light image plane in such a way that the focal point of the optical element (2) lies within the light image plane.

18 Claims, 3 Drawing Sheets

(51) Int. Cl.
  *F21S 41/25* (2018.01)
  *F21S 41/29* (2018.01)
  *G02B 7/02* (2021.01)

(56) References Cited

U.S. PATENT DOCUMENTS

2016/0025291 A1* 1/2016 Iwasaki ................. F21S 41/322
  362/516
2020/0353860 A1* 11/2020 Sieme ................... F21S 41/192

FOREIGN PATENT DOCUMENTS

DE 102014000474 A1 10/2014
DE 102017106864 A1 * 10/2018
DE 102017106864 A1 10/2018
EP 2133721 A1 12/2009

OTHER PUBLICATIONS

Mozaffari et al., Fahrzeugscheinwerfer, insbesondere Kraftfahrzeugscheinwerfer, 2014, DE102014000474A1, English Translation, https://worldwide.espacenet.com/patent/search/family/051567623/publication/DE102014000474A1?q=pn%3DDE102014000474A1 (Year: 2014).*
International Search Report for PCT/EP2021/073517 dated Oct. 25, 2021 (14 pages).
Search Report for European Patent Application No. 20200332.3 dated Feb. 22, 2021 (9 pages).

* cited by examiner

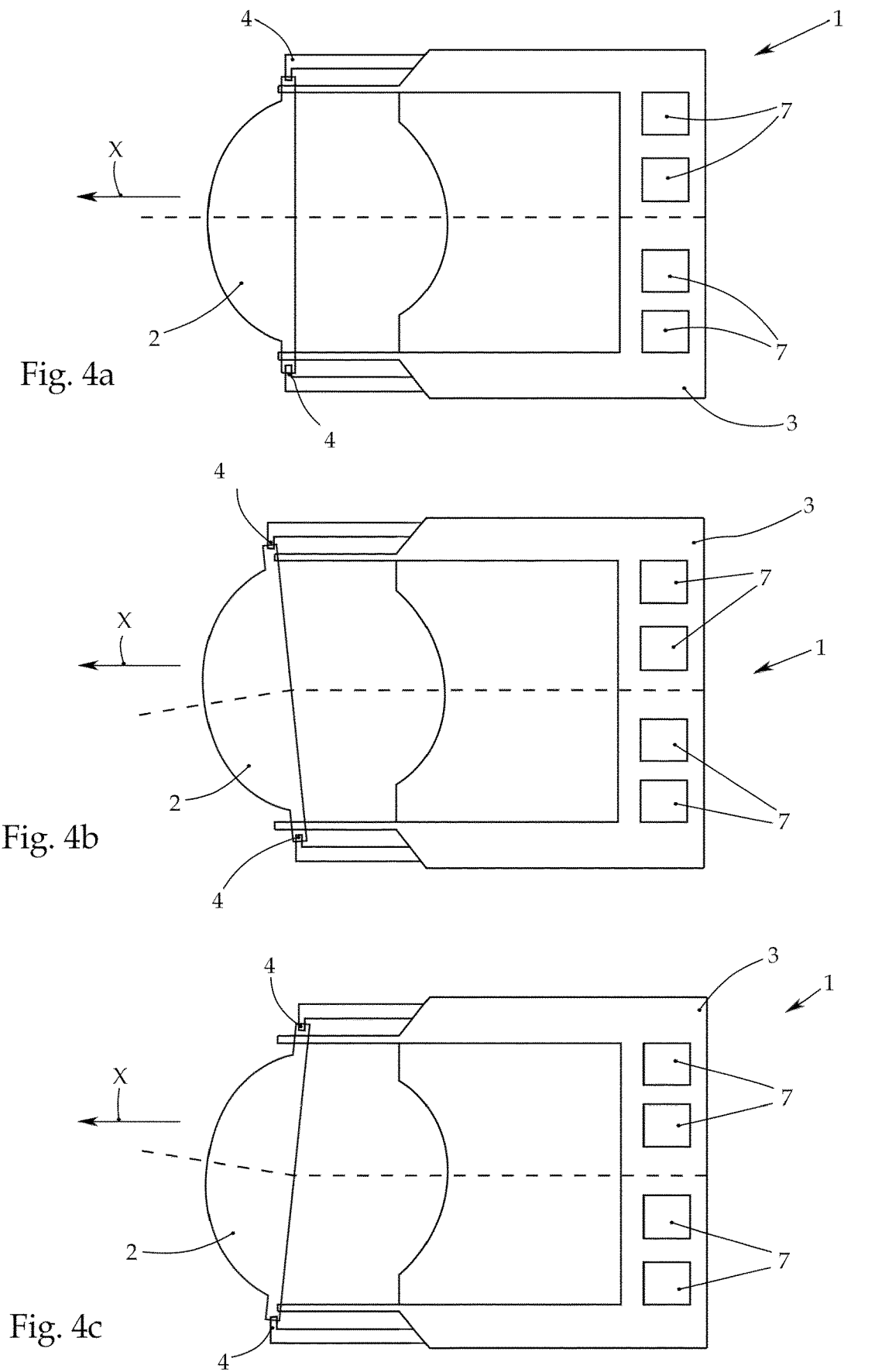

ILLUMINATION DEVICE FOR A MOTOR VEHICLE HEADLIGHT

The invention relates to an illumination device for a motor vehicle headlight, comprising:
- an illuminant for generating and emitting light, wherein the illuminant is designed to generate a light image in a light image plane,
- an optical element for forming light distribution from the light image generated with the illuminant, wherein the optical element is arranged downstream of the light image plane in the direction of light propagation and has a focal point and an optical axis, wherein the focal point lies between the optical element and the illuminant and the optical axis runs between the optical element and the illuminant, wherein the optical element is designed to project the light image in the form of light distribution into a traffic area,
- a holding device, which is designed to hold the position of the optical element in relation to the illuminant, preferably in such a way that in a switched-off state of the illuminant, the focal point of the optical element is outside the light image plane.

The invention further relates to a motor vehicle headlight, comprising an illumination device.

Illumination devices for motor vehicle headlights are known from the prior art. These usually have an illuminant and an imaging system, which projects the light of the illuminant into a traffic area. Disadvantageously, the imaging system heats up due to the temperature, in particular due to the heat generated by the illuminant, which is associated with an undesired thermal expansion of the imaging system. This can lead to imaging errors, which can alter the light image produced with the imaging system.

In order to minimize the temperature-related expansion of the components of an illumination device, cooling of the illuminant or imaging system or particularly efficient thermal insulation of the illuminant or imaging system is usually implemented in the prior art. However, this requires costly and complex cooling systems or insulation systems.

The object of the present invention consists in mitigating or eliminating the disadvantages of the prior art. The objective of the invention is therefore in particular to create an illumination device, in which the compensation of the temperature-related expansions of the illumination device is improved.

This object is achieved by an illumination device having the features of claim 1. Advantageous embodiments are specified in the dependent claims.

According to the invention, the holding device has at least one compensating element, which connects the optical element to the holding device, wherein the compensating element has a first end section and a second end section, wherein the first end section is connected to the optical element and the second end section is connected to the holding device, wherein the compensating element is made of a material that is designed in such a way that the compensating element has a temperature-dependent longitudinal extension in one direction (X), wherein the direction (X) runs parallel to the optical axis of the optical element, wherein the compensating element is connected to the optical element in such a way as to pivot and/or move the optical element as a function of a temperature relative to the light image plane in such a way that the focal point of the optical element lies within the light image plane.

This has the advantage that a movement of the focal point of the optical element due to a temperature-related expansion of the optical element can be compensated. The optical element has a focal point or focal line, wherein the optical element projects desired or required light distribution into a traffic area when the focal point lies within the light image plane. In a switched-on operating state of the illuminant, there may be a temperature-related expansion of the optical element, shifting the focal point out of the light image plane. The compensating element has such a temperature-dependent (or temperature-related) change in length or longitudinal extension (the length of the compensating element is in particular variable and can increase with an increasing temperature in the direction (X) and decrease with a decreasing temperature in the direction (X)) that it can compensate the heat-related movement of the focal point, in particular with a corresponding change in length. The pivoting or movement of the optical element counteracts the heat-related movement of the focal point such that the optical element is pivoted and/or moved relative to the illuminant or light image plane so that the focal point lies within the light image plane after pivoting or movement. The focal point can lie outside the light image plane in a switched-off state of the illuminant, and can lie within the light image plane in a switched-on state of the illuminant, in which there is a higher temperature compared to the switched-off state, due to the pivoting and/or movement of the optical element. The focal point movement can be caused by the temperature-related expansion or temperature-related compression of the compensating element. The compensating element can be designed to pivot and/or move the optical element in such a way that the focal point always lies within the light image plane, in particular at a given temperature or during or after a temperature change. In other words, the compensating element can be designed to continuously or dynamically pivot and/or move the optical element during a continuous change in temperature, for example a (preferably continuous) rise in temperature or drop in temperature. The material of the compensating element can be selected such that a temperature-dependent change in length of the compensating element compensates or offsets the movement of the focal point due to the optical element heating up. The holding device can be arranged between the illuminant and the optical element. The illuminant can have a light source, for example an LED or a laser light source, and can comprise means designed to produce a light image in a light image plane. The optical element can project the light image in the form of light distribution, for example dipped beam distribution, into a traffic area. The compensating element can be designed such that a change in temperature, preferably a continuous change in temperature, causes a (preferably continuous) change in length of the compensating element. The length of the compensating element is in particular a function of the temperature. The change in length due to a change in temperature can, for example, be 0.1 mm-1 mm, preferably 0.2 mm-0.8 mm, per 10° C. The compensating element can comprise, for example, a metal or a plastic, preferably aluminium, zinc die-cast, polycyclohexylene dimethylene terephthalate, polyphenylene ether, polyamide, polyvinyl chloride, polypropylene.

It can be provided that the pivoting and/or movement of the optical element by the temperature-dependent change in the longitudinal extension of the compensating element comprises a pivotal movement of the optical element about a y-axis and/or about a z-axis and/or a movement along the direction (X), wherein the y-axis is oriented orthogonal to the z-axis and the y- and z-axes are each oriented orthogonal to the direction (X). The direction (X) can be oriented in the direction of light emission and/or direction of travel of a motor vehicle that has the illumination device. The y- and z-axes preferably lie within a plane of symmetry of the optical element, wherein the plane of symmetry is oriented orthogonal to the direction (X). The optical element can, for example, comprise a lens, wherein the plane of symmetry forms the plane of symmetry of the lens.

It can be provided that the holding device has at least one engagement element, wherein the engagement element has at least two detent recesses, which are arranged spaced apart from one another in the direction (X), wherein the compensating element has a detent element, which is designed to engage in one of the detent recesses of the engagement element, wherein the engagement of the detent element in the first detent recess defines a first position of the optical element relative to the illuminant and the engagement of the detent element in the second detent recess defines a second position of the optical element relative to the illuminant, wherein the optical element is pivoted and/or moved relative to the illuminant in the first position with respect to the second position. In the first position, the optical element can have a first distance from the illuminant or light image plane, and in the second position it can have a second distance. In the first position, the optical element can have a first angle to the illuminant or light image plane, and in the second position it can have a second angle. During a transition, in which the detent element is transferred from the first detent recess to the second detent recess, there is preferably a movement of the optical element from the first distance to the second distance and/or from the first angle to the second angle. The compensating element and the holding device can in particular also be connected to one another in a fixed, rigid or undetachable manner, wherein the connection between the compensating element and the holding device can be established, for example, by means of a laser weld joint.

It can be provided that the optical element is pivoted relative to the illuminant about a y-axis and/or about a z-axis and/or is moved along the direction (X) in the first position with respect to the second position, wherein the y-axis is oriented orthogonal to the z-axis and the y- and z-axes are each oriented orthogonal to the direction (X). The y- and z-axes preferably lie within a plane of symmetry of the optical element, wherein the plane of symmetry is oriented orthogonal to the direction (X).

It can be provided that the pivoting and/or movement of the optical element from the first position to the second position is greater than the pivoting and/or movement of the optical element by the temperature-dependent longitudinal extension of the compensating element. This has the advantage that a rough or large compensation of the displacement of the focal point due to the change in temperature of the optical element can occur with the pivoting and/or movement of the optical element from the first position to the second position, and the temperature-dependent change in the longitudinal extension of the compensating element can result in a fine or small compensation of the displacement of the focal point.

It can be provided that the optical element has a first and a second fastening region, wherein the first fastening region is arranged diametrically to the second fastening region, wherein the compensating element is connected to the optical element on the first fastening region and a further compensating element is connected to the optical element on the second fastening region, wherein the compensating element is connected to the holding device and engages on a first engagement element and the further compensating element is connected to the holding device and engages on a second engagement element. This has the advantage that, for example, a pivotal movement of the optical element about the y-axis can occur with the compensating element, and a pivotal movement of the optical element about the z-axis can occur with the further compensating element.

It can be provided that the detent element is designed as a detent lug, which extends away from a surface of the compensating element substantially along the y- or z-axis.

It can be provided that the compensating element is rod-shaped. In particular, the compensating element is elongate in design. The compensating element preferably has a length that is at least 5 times, preferably 10 times, particularly preferably more than 15 times larger than the width and height of the compensating element.

It can be provided that the holding device is designed as a hollow body, which comprises a light guiding channel and a jacket surrounding the light guiding channel, wherein the jacket has a first end section and a second end section opposite the first end section, wherein at least one end section has the at least one engagement element, wherein preferably the illuminant is arranged on the first end section and the optical element is arranged on the second end section. The holding element can be designed as a hollow light guiding tube, wherein the illuminant is arranged on a first end of the light guiding tube and the optical element is arranged on a second end of the light guiding tube.

It can be provided that the light of the illuminant is emitted from the illuminant through the light guiding channel onto the optical element, wherein the jacket is preferably opaque.

It can be provided that the engagement element has three or more detent recesses. The rough compensation of the temperature-related focal point displacement can thus occur in three or more steps. The two, three or more detent recesses are in particular arranged equally spaced apart from one another.

It can be provided that the optical element is designed as a lens. The lens can, for example, be a spherical, aspheric, convex, biconvex, concave, biconcave lens or a free-form lens.

It can be provided that a screen is arranged between the illuminant and the optical element, wherein the screen preferably lies in the light image plane.

It can be provided that the compensating element has a first thermal expansion coefficient, the optical element has a second thermal expansion coefficient and the holding device has a third thermal expansion coefficient, wherein the first thermal expansion coefficient is different to the second and third thermal expansion coefficients. The second and third thermal expansion coefficients can each be the same or different. The first thermal expansion coefficient can be between 0.03 and 0.25 $K^{-1}$, preferably between 0.06 and 0.2 $K^{-1}$.

According to the invention, a motor vehicle headlight comprising an illumination device is provided.

In the context of this description, the terms "above", "below", "horizontal", "vertical" should be understood as indications of orientation when the illumination device is arranged in its normal position of use after having been fitted to a motor vehicle, for instance.

The invention is outlined in more detail below based on a preferred exemplary embodiment, to which it is, however, not limited: In the drawings:

FIG. 4a-4c show horizontal sectional views of three states of the illumination device.

Figure 1:
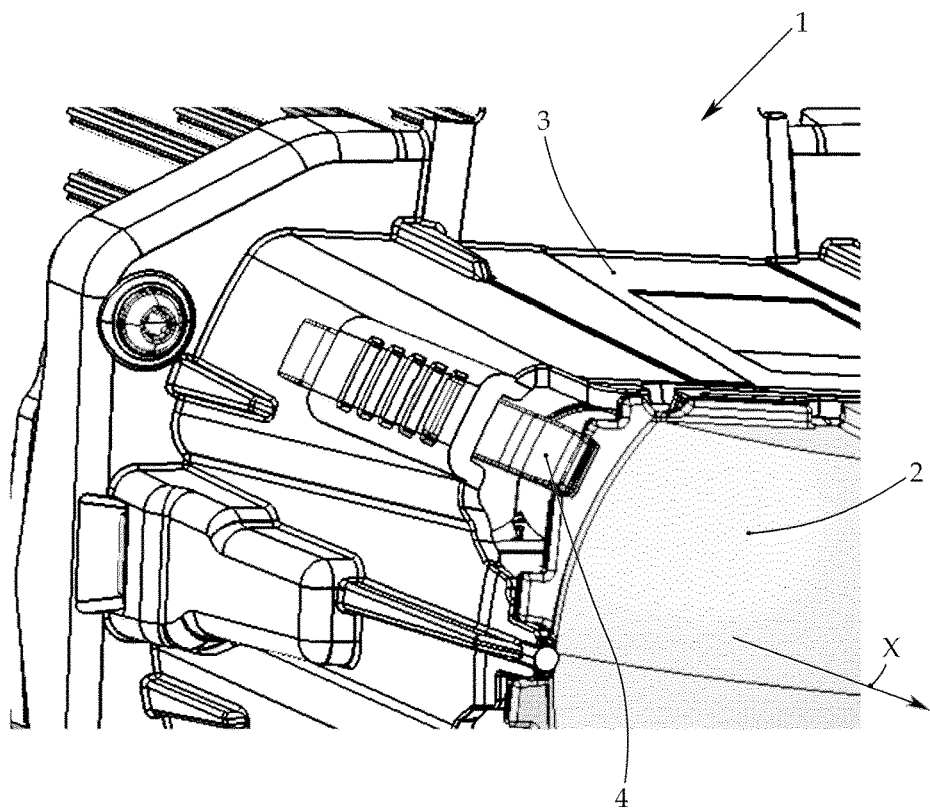
FIG. 1 shows a detail view of an illumination device according to the invention.

FIG. 1 shows a detail view of an illumination device 1 for a motor vehicle headlight. Non-essential elements are not shown in order to simplify the illustration. The illumination device 1 comprises an illuminant (not shown) for generating and emitting light. The illuminant is designed to generate a light image in a light image plane. Furthermore, the illumination device 1 comprises an optical element 2 for forming light distribution from the light image generated with the illuminant. The optical element 2 is arranged downstream of the light image plane in the direction of light propagation and has a focal point and an optical axis 2a. In the exemplary embodiment, the optical element 2 is designed as a lens. The focal point of the optical element 2 lies between the optical element 2 and the illuminant and the optical axis 2a runs between the optical element 2 and the illuminant. The optical element 2 is designed to project the light image in the form of light distribution into a traffic area, for example in the form of a dipped beam or full beam.

The illumination device 1 comprises a holding device 3, which is designed in particular to hold the position of the optical element 2 in relation to the illuminant in such a way that in a switched-off state of the illuminant, the focal point of the optical element 2 is preferably outside the light image plane. In an alternative embodiment, the holding device 3 can be designed to hold the position of the optical element 2 in relation to the illuminant in such a way that in a switched-off state of the illuminant, the focal point of the optical element 2 is inside the light image plane.

The holding device 3 has at least one compensating element 4, which connects the optical element 2 to the holding device 3. The compensating element 4 has a first end section 4a and a second end section 4b, wherein the first end section 4a is connected to the optical element 2 and the second end section 4b is connected to the holding device 3. The compensating element is in particular rod-shaped.

The compensating element 4 is made of a material that is designed in such a way that the compensating element 4 has a temperature-dependent longitudinal extension in one direction X, wherein the direction X runs parallel to the optical axis 2a of the optical element 2. The compensating element 4 is connected to the optical element 2 in such a way as to pivot and/or move the optical element 2 as a function of a temperature relative to the light image plane in such a way that the focal point of the optical element 2 preferably always lies within the light image plane.

The pivoting and/or movement of the optical element 2 by the temperature-dependent change in the longitudinal extension of the compensating element 4 can comprise a pivotal movement of the optical element 2 about a y-axis and/or about a z-axis and/or a movement along the direction X. The y-axis can be oriented orthogonal to the z-axis and the y- and z-axes can each be oriented orthogonal to the direction X.

Figure 2:
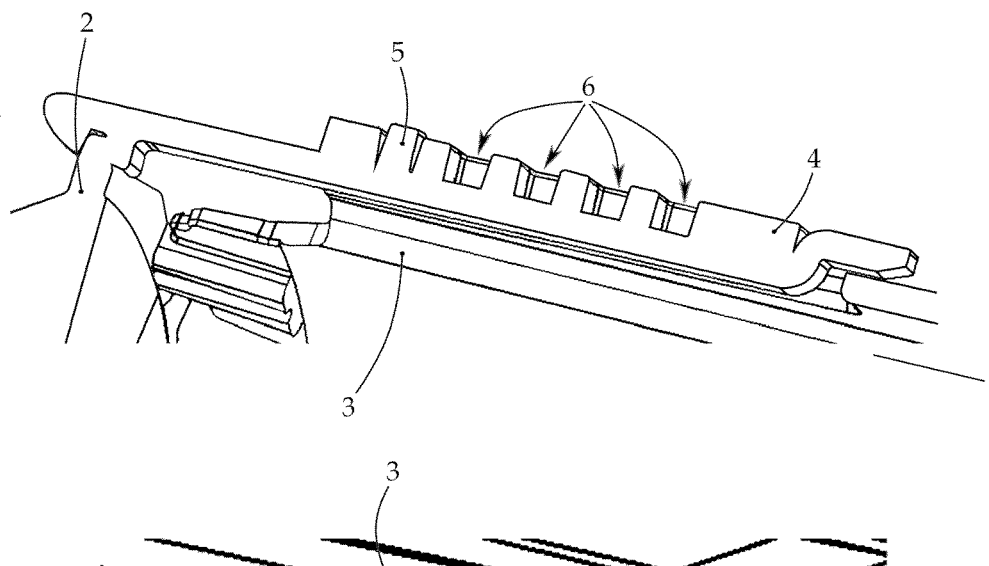
FIG. 2 shows a further detail view of the illumination device.
Figure 3:
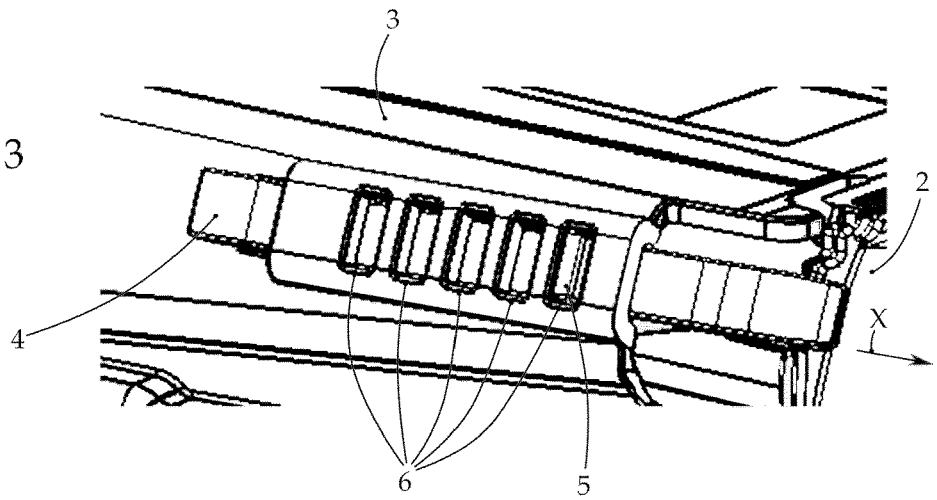
FIG. 3 shows a detail view of the compensating element.

As shown in detail in FIGS. 2 and 3, the holding device 3 has at least one engagement element 6, wherein the engagement element 6 has at least two detent recesses 6a, 6b, which are arranged spaced apart from one another in the direction X. The compensating element 4 has a detent element 5, which is designed to engage in one of the detent recesses 6a, 6b of the engagement element 6. The detent element 5 can be designed as a detent lug, which extends substantially orthogonally away from a surface of the compensating element 4. The engagement element 6 can have three or more detent recesses 6a, 6b, 6c; in the exemplary embodiment shown, the engagement element 6 has five detent recesses.

The engagement of the detent element 5 in the first detent recess 6a defines a first position of the optical element 2 relative to the illuminant and the engagement of the detent element 5 in the second detent recess 6b defines a second position of the optical element 2 relative to the illuminant. The optical element 2 can be pivoted and/or moved relative to the illuminant in the first position with respect to the second position. The optical element 2 can be pivoted relative to the illuminant about a y-axis and/or about a z-axis and/or moved along the direction X in the first position with respect to the second position, wherein the y-axis is oriented orthogonal to the z-axis and the y- and z-axes are each oriented orthogonal to the direction X.

The pivoting and/or movement of the optical element 2 from the first position to the second position is greater than the pivoting and/or movement of the optical element 2 by the temperature-dependent longitudinal extension of the compensating element 4.

The optical element 2 can have a first and a second fastening region, wherein the first fastening region is arranged diametrically to the second fastening region. The compensating element 4 can be connected to the optical element 2 on the first fastening region and a further compensating element 4 can be connected to the optical element 2 on the second fastening region, wherein the compensating element 4 is connected to the holding device 3 and engages on a first engagement element 6 and the further compensating element 4 is connected to the holding device and engages on a second engagement element 6.

As shown in FIGS. 4a-4c and 5a-5c, the holding device 3 is preferably designed as a hollow body, which comprises a light guiding channel and a jacket surrounding the light guiding channel, wherein the jacket has a first end section and a second end section opposite the first end section. At least one end section has the at least one engagement element 6, wherein preferably the illuminant is arranged on the first end section and the optical element is arranged on the second end section.

The light of the illuminant is emitted from the illuminant through the light guiding channel onto the optical element 2, wherein the jacket is preferably opaque.

A screen can be arranged between the illuminant and the optical element 2, wherein the screen preferably lies in the light image plane.

The exemplary embodiment of the illumination device 1 shown in FIGS. 4a-4c and 5a-5c has four compensating elements 4, wherein the optical element 2 has four corners, and a compensating element 4 is connected to the optical element 2 at each corner or at each corner region of the optical element 2. The illustrations in FIG. 4a-4c and FIG. 5a-5c are highly simplified and purely schematic. The holding device 3 has four engagement elements 6 cooperating with the compensating elements 4 or corresponding to the compensating elements 4, wherein one engagement element 6 respectively cooperates with one compensating element 4.

FIG. 4a-4c show plan views of horizontal sections of three states of the illumination device 1.

FIG. 4a shows a first state, in which the optical element 2 is not pivoted relative to the light image plane or light sources 7. In this state, the light sources 7 are preferably switched off and emit no light. The compensating elements 4, which connect the optical element 2 to the holding device 3, have a first length in the first state.

FIG. 4b shows a second state, in which the optical element 2 is pivoted relative to the light image plane or light sources 7. In this state, the light sources 7 are preferably switched on and emit light. The heat emitted by the light sources 7 results in a change in length of the compensating elements 4, in particular in a longitudinal extension of the compensating elements 4. The compensating elements 4 have a second length in the second state.

The material of the four compensating elements 4 is selected such that the heat-related longitudinal extension of the individual compensating elements 4 is such that there is a pivotal movement of the optical element 2 (in the direction of light propagation) to the left. Accordingly, the compensating elements 4 arranged on the right side of the optical element 2 in the direction of light propagation (top left in FIG. 4b) have a larger heat-related change in length than the compensating elements 4 arranged on the left side of the optical element in the direction of light propagation (bottom left in FIG. 4b).

In FIG. 4c, the compensating elements 4 arranged on the right side of the optical element 2 in the direction of light propagation (top left in FIG. 4c) have a smaller heat-related change in length than the compensating elements 4 arranged on the left side of the optical element in the direction of light propagation (bottom left in FIG. 4c). This results in a pivotal movement of the optical element to the right.

The dashed line shown in FIG. 4a-4c indicates the direction of light propagation of the light emitted with the illumination device 1.

With the pivotal movements of the optical element 2 shown in FIGS. 4b and 4c, light that is emitted from the illumination device 1 into a traffic area can in particular be pivoted in a horizontal plane, whereby a cornering light, for example, can be achieved.

Figure 5A:
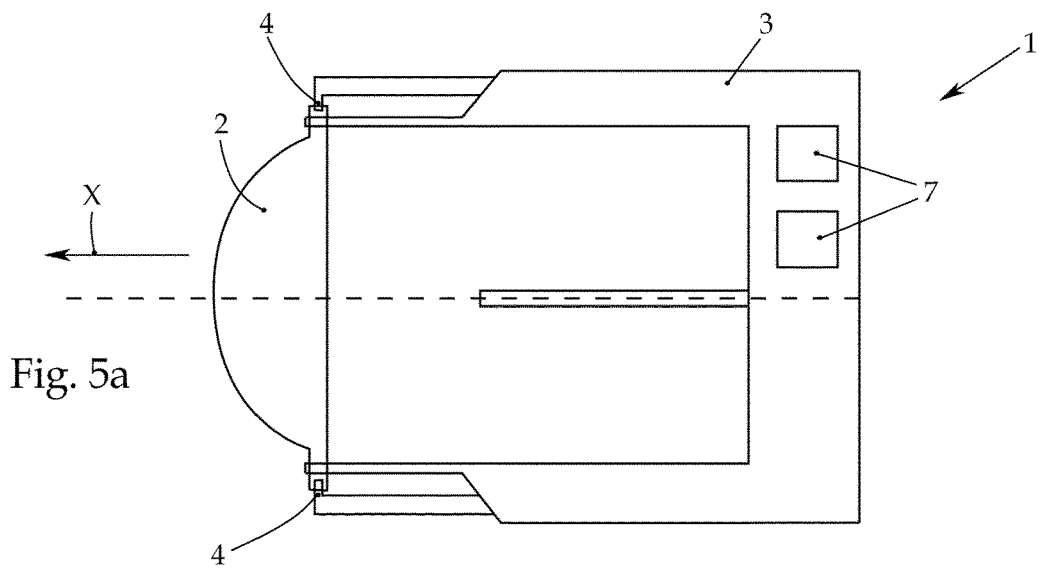
FIG. 5a-5c show vertical sectional views of three states of the illumination device.
Figure 5B:
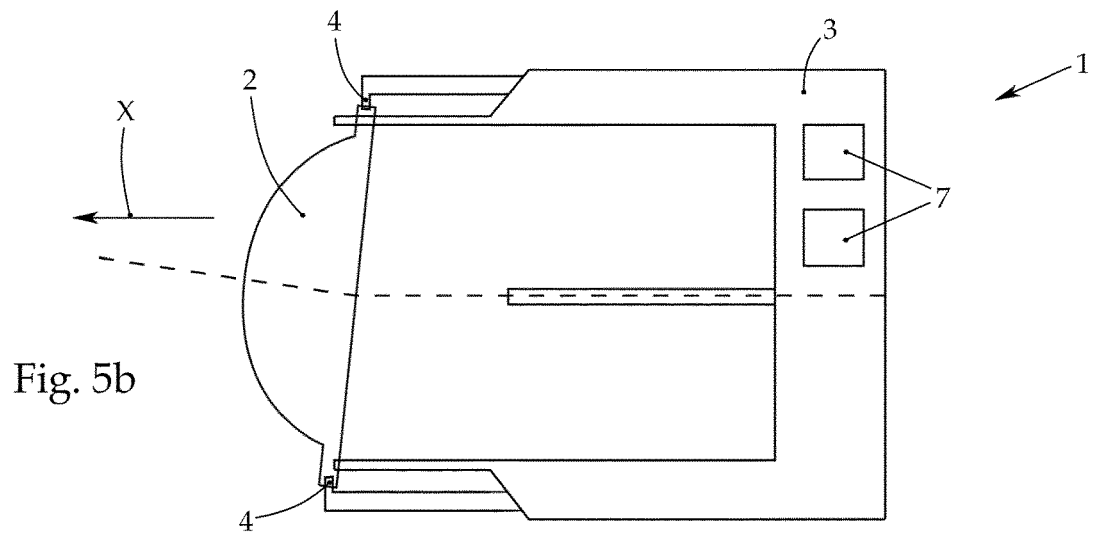
Figure 5C:
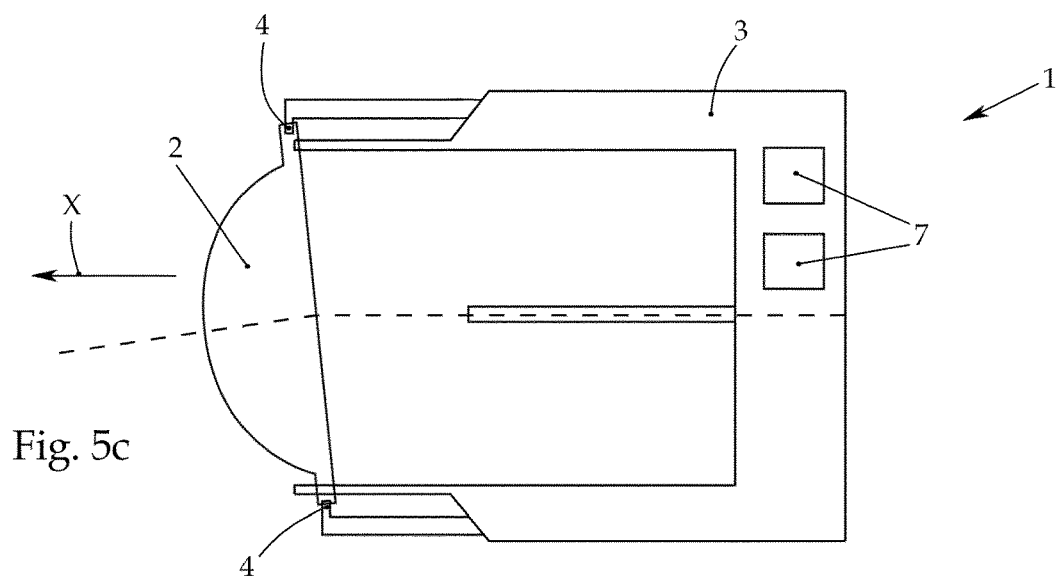

FIG. 5a-5c show side views of vertical sections of three states of the illumination device 1.

FIG. 5a shows a state, in which the optical element 2 is not pivoted relative to the light image plane or light sources 7. Similarly to FIG. 4a, the light sources 7 are switched off in this state and emit no light. Two light sources 7 are provided in this exemplary embodiment. Any number of light sources 7 can also be provided. The compensating elements 4, which connect the optical element 2 to the holding device 3, have a first length in this state.

FIGS. 5b and 5c both show pivoted states. In FIG. 5b, the heat-related change in length of the compensating elements 4 causes the optical element 2 to pivot upwards (as seen in the direction of light propagation). In FIG. 5c, the heat-related change in length of the compensating elements 4 causes the optical element 2 to pivot downwards. The pivotal movement of the optical element 2 shown in FIGS. 5b and 5c can vary or adjust the vertical height of the light emitted by the illumination device into a traffic area.

The dashed line shown in FIG. 5a-5c indicates the direction of light propagation of the light emitted with the illumination device 1.

The invention claimed is:

1. An illumination device (1) for a motor vehicle headlight, comprising:
   an illuminant for generating and emitting light, wherein the illuminant is designed to generate a light image in a light image plane;
   an optical element (2) for forming light distribution from the light image generated with the illuminant, wherein the optical element (2) is arranged downstream of the light image plane in a direction of light propagation and has a focal point and an optical axis (2a), wherein the focal point lies between the optical element (2) and the illuminant and the optical axis (2a) runs between the optical element (2) and the illuminant, wherein the optical element (2) is designed to project the light image in the form of light distribution into a traffic area; and
   a holding device (3), which is designed to hold a position of the optical element (2) in relation to the illuminant, in such a way that in a switched-off state of the illuminant, the focal point of the optical element (2) is outside the light image plane,
   wherein the holding device (3) has at least one compensating element (4), which connects the optical element (2) to the holding device (3), wherein the at least one compensating element (4) has a first end section (4a) and a second end section (4b), wherein the first end section (4a) is connected to the optical element (2) and the second end section (4b) is connected to the holding device (3), wherein the at least one compensating element (4) is made of a material that is designed in such a way that the at least one compensating element (4) has a temperature-dependent longitudinal extension in a direction (X), wherein the direction (X) runs parallel to the optical axis (2a) of the optical element (2), wherein the at least one compensating element (4) is connected to the optical element (2) in such a way as to pivot and/or move the optical element (2) as a function of a temperature relative to the light image plane in such a way that, in a switched-on state of the illuminant, in which there is a higher temperature compared to the switched-off state, the focal point of the optical element (2) lies within the light image plane.

2. The illumination device (1) according to claim 1, wherein a pivoting and/or movement of the optical element (2) by a change in the temperature-dependent longitudinal extension of the at least one compensating element (4) comprises a pivotal movement of the optical element (2) about a y-axis and/or about a z-axis and/or a movement along the direction (X), wherein the y-axis is oriented orthogonal to the z-axis and the y- and z-axes are each oriented orthogonal to the direction (X).

3. The illumination device (1) according to claim 1, wherein the holding device (3) has at least one engagement element (6), wherein the engagement element (6) has at least two detent recesses (6a, 6b), which are arranged spaced apart from one another in the direction (X), wherein the at least one compensating element (4) has a detent element (5), which is designed to engage in at least one of a first detent recess (6a) or a second detent recess (6b) of the engagement element (6), wherein an engagement of the detent element (5) in the first detent recess (6a) defines a first position of the optical element (2) relative to the illuminant and the engagement of the detent element (5) in the second detent recess (6b) defines a second position of the optical element (2) relative to the illuminant, wherein the optical element (2) is pivoted and/or moved relative to the illuminant in the first position with respect to the second position.

4. The illumination device (1) according to claim 3, wherein the optical element (2) is pivoted relative to the illuminant about a y-axis and/or about a z-axis and/or is moved along the direction (X) in the first position with respect to the second position, wherein the y-axis is oriented orthogonal to the z-axis and the y- and z-axes are each oriented orthogonal to the direction (X).

5. The illumination device (1) according to claim 4, wherein a pivoting and/or movement of the optical element (2) from the first position to the second position is greater than the pivoting and/or movement of the optical element (2) by the temperature-dependent longitudinal extension of the at least one compensating element (4).

6. The illumination device (1) according to claim 3, wherein the optical element (2) has a first and a second fastening region, wherein the first fastening region is arranged diametrically to the second fastening region, wherein the at least one compensating element (4) is connected to the optical element (2) on the first fastening region and a further compensating element (4) is connected to the optical element (2) on the second fastening region, wherein the at least one compensating element (4) is connected to the holding device (3) and engages on a first engagement element (6) and the further compensating element (4) is connected to the holding device and engages on a second engagement element (6).

7. The illumination device (1) according to claim 3, wherein the detent element (5) is designed as a detent lug, which extends away from a surface of the at least one compensating element (4) substantially along the y- or z-axis.

8. The illumination device (1) according to claim 3, wherein the engagement element (6) has three or more detent recesses (6a, 6b, 6c).

9. The illumination device (1) according to claim 1, wherein the at least one compensating element is rod-shaped.

10. The illumination device (1) according to claim 1, wherein the holding device (3) is designed as a hollow body, which comprises a light guiding channel and a jacket surrounding the light guiding channel, wherein the jacket has a first end section and a second end section opposite the first end section, wherein at least one end section has at least one engagement element (6).

11. The illumination device (1) according to claim 10, wherein the light of the illuminant is emitted from the illuminant through the light guiding channel onto the optical element.

12. The illumination device according to claim 11, wherein the jacket is opaque.

13. The illumination device according to claim 10, wherein the illuminant is arranged on the first end section and the optical element is arranged on the second end section.

14. The illumination device (1) according to claim 1, wherein the optical element (2) is designed as a lens.

15. The illumination device (1) according to claim 1, wherein a screen is arranged between the illuminant and the optical element (2).

16. The illumination device according to claim 15, wherein the screen lies in the light image plane.

17. The illumination device (1) according to claim 1, wherein the at least one compensating element (4) has a first thermal expansion coefficient, the optical element (2) has a second thermal expansion coefficient and the holding device (3) has a third thermal expansion coefficient, wherein the first thermal expansion coefficient is different to the second and third thermal expansion coefficients.

18. A motor vehicle headlight, comprising an illumination device (1) according to claim 1.

* * * * *